US012570893B2

(12) United States Patent
Gizzatov et al.

(10) Patent No.: US 12,570,893 B2
(45) Date of Patent: Mar. 10, 2026

(54) TIME DEPENDENT TRACER RELEASE IN STIMULATED GAS WELLS USING COMPOSITE PARTICLES MADE OF THERMOPLASTIC POLYESTER AND POLYAMIDE BLENDS OF VARIOUS RATIOS

(71) Applicant: SAUDI ARABIAN OIL COMPANY, Dhahran (SA)

(72) Inventors: Ayrat Gizzatov, Winchester, MA (US); Shitong Sherry Zhu, Waban, MA (US); Nermeen Saadoun, Somerville, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/754,750

(22) Filed: Jun. 26, 2024

(65) Prior Publication Data

US 2026/0002072 A1 Jan. 1, 2026

(51) Int. Cl.
*C09K 8/88* (2006.01)
*E21B 47/11* (2012.01)

(52) U.S. Cl.
CPC .............. *C09K 8/885* (2013.01); *E21B 47/11* (2020.05)

(58) Field of Classification Search
CPC ................................. C09K 8/885; E21B 47/11
See application file for complete search history.

(56) References Cited

U.S. PATENT DOCUMENTS 4,264,329 A 4/1981 Beckett
5,111,882 A 5/1992 Tang et al.
(Continued)

FOREIGN PATENT DOCUMENTS

WO 2016014310 A1 1/2016
WO 2019058098 A1 3/2019

OTHER PUBLICATIONS

Non-Final Office Action issued by U.S. Patent Office for corresponding U.S. Appl. No. 17/815,379, mailed May 3, 2023 (16 pages).
(Continued)

*Primary Examiner* — Crystal J Lee
(74) *Attorney, Agent, or Firm* — Osha Bergman Watanabe & Burton LLP

(57) ABSTRACT

A method for monitoring gas production in a subterranean formation includes introducing a polymer composite particle having a degradable polymer blend and a tracer into a stimulation fluid, where the degradable polymer blend includes a polymer blend of a first degradable polymer and a second degradable polymer; injecting the stimulation fluid including the polymer composite particle into a treatment zone including one opening, where the polymer composite particle remains and is exposed to moisture at downhole temperature which degrades the degradable polymer blend in 7 to 15 days; recovering produced gas which includes the tracer; determining a presence of the tracer; and correlating the presence of the tracer to the treatment zone. A composition includes a polymer composite particle of a degradable polymer blend of a first degradable polymer of polyester, polyester copolymers, and combinations thereof and a second degradable polymer of polyamide, a tracer, and a stimulation fluid.

5 Claims, 4 Drawing Sheets

400

Introducing a polymer composite particle having a degradable polymer blend and a tracer into a stimulation fluid — 402

Injecting the stimulation fluid into a treatment stage of a treatment zone of a subterranean formation — 404

Maintaining the polymer composite particle in the treatment stage where the polymer composite particle is exposed to moisture — 406

Degrading the degradable polymer blend upon exposure to moisture — 408

Recovering produced gas from the treatment stage that contains the tracer — 410

Determining a presence of the tracer in the produced gas — 412

Correlating the presence of the tracer to the treatment stage — 414

(56) References Cited

U.S. PATENT DOCUMENTS

| | | | |
|---|---|---|---|
| 6,645,769 | B2 | 11/2003 | Tayebi et al. |
| 6,799,634 | B2 | 10/2004 | Hartog et al. |
| 7,032,662 | B2 | 4/2006 | Malone et al. |
| 7,196,040 | B2 | 3/2007 | Heath et al. |
| 7,347,260 | B2 | 3/2008 | Ferguson et al. |
| 7,560,690 | B2 | 7/2009 | Stray et al. |
| 8,393,395 | B2 | 3/2013 | Cochet et al. |
| 8,877,506 | B2 | 11/2014 | Roberts et al. |
| 9,290,689 | B2 | 3/2016 | Lafitte et al. |
| 9,594,070 | B2 | 3/2017 | Rule et al. |
| 9,856,732 | B2 | 1/2018 | Jessheim et al. |
| 9,874,080 | B2 | 1/2018 | Gupta et al. |
| 9,926,591 | B2 | 3/2018 | McCann et al. |
| 10,030,507 | B2 | 7/2018 | Nyhavn et al. |
| 10,030,508 | B2 | 7/2018 | Romer et al. |
| 10,208,559 | B2 | 2/2019 | Takahashi et al. |
| 10,351,759 | B2 | 7/2019 | Sayfritz et al. |
| 10,400,159 | B2 | 9/2019 | Gupta |
| 10,413,966 | B2 | 9/2019 | Murugesan et al. |
| 10,865,637 | B2 | 12/2020 | Kulyakhtin et al. |
| 10,895,148 | B2 | 1/2021 | Nyhavn et al. |
| 10,927,292 | B2 | 2/2021 | Borrell et al. |
| 10,961,443 | B2 | 3/2021 | Zhao |
| 10,961,445 | B2 | 3/2021 | Ogle et al. |
| 11,084,966 | B2 | 8/2021 | Burns et al. |
| 11,286,418 | B2 | 3/2022 | Duenckel et al. |
| 11,292,960 | B2 | 4/2022 | Planells et al. |
| 11,401,800 | B2 | 8/2022 | Tippit et al. |
| 11,414,974 | B2 | 8/2022 | Entchev et al. |
| 11,427,742 | B2 | 8/2022 | AlJabri et al. |
| 11,447,693 | B2 | 9/2022 | Jenkins et al. |
| 11,773,317 | B2 | 10/2023 | Kersey |
| 2006/0166838 | A1 | 7/2006 | Collins et al. |
| 2010/0307745 | A1* | 12/2010 | Lafitte ..................... E21B 47/11 |
| | | | 166/250.12 |
| 2011/0277996 | A1 | 11/2011 | Cullick et al. |
| 2013/0017610 | A1 | 1/2013 | Roberts et al. |
| 2016/0075937 | A1 | 3/2016 | Cannan et al. |
| 2016/0209391 | A1 | 7/2016 | Zhang et al. |
| 2016/0237774 | A1 | 8/2016 | Okura et al. |
| 2016/0272882 | A1 | 9/2016 | Stray et al. |
| 2018/0155597 | A1 | 6/2018 | Burns et al. |
| 2018/0282605 | A1 | 10/2018 | Borrell et al. |
| 2018/0298277 | A1 | 10/2018 | Borrell et al. |
| 2018/0306027 | A1 | 10/2018 | Sherman et al. |
| 2020/0024506 | A1 | 1/2020 | Trudel et al. |
| 2020/0283678 | A1* | 9/2020 | Ogle ........................ C09K 8/92 |
| 2021/0108123 | A1 | 4/2021 | Jamison et al. |
| 2022/0017815 | A1 | 1/2022 | Mohanty et al. |
| 2022/0145168 | A1 | 5/2022 | Kersey |
| 2022/0276217 | A1 | 9/2022 | Schimmel et al. |
| 2023/0129848 | A1 | 4/2023 | Shi et al. |
| 2023/0141819 | A1 | 5/2023 | Wang et al. |
| 2023/0144199 | A1 | 5/2023 | Wang et al. |
| 2023/0174839 | A1 | 6/2023 | Solovyeva et al. |
| 2024/0035373 | A1* | 2/2024 | Gizzatov ................. E21B 43/25 |
| 2024/0337183 | A1 | 10/2024 | Saini et al. |

OTHER PUBLICATIONS

Final Office Action issued by U.S. Patent Office for corresponding U.S. Appl. No. 17/815,379, mailed Sep. 11, 2023 (15 pages).

Antoniv et al., "Method For Detecting Nanoparticles On Cuttings Recovered From A Gas Reservoir." Energy Fuels 2021, 35, 9, 7708-7716, Apr. 16, 2021 (9 pages).

Diaz et al., "Effect of hydrolytic degradation on the mechanical property of a thermoplastic polyether ester elastomer," Polymer Degradation and Stability, vol. 155, Sep. 2018, pp. 35-42 (28 pages).

J. Spencer, "Using Tracer Techonology In Unconventional Wells", Hart Energy, May 1, 2015 (8 pages).

S. Rashdan et al., "Effect of the preparation route, PEG and annealing on the phase stability of Fe3O4 nanoparticles and their magnetic properties", Journal of Experimental Nanoscience, vol. 8, No. 2, pp. 210-222, Published Online Aug. 4, 2011 (14 pages).

Jilla Schaff, "Fluorinated esters: synthesis and identifications" (1988). Dissertations and thesis, Introduction. Paper 3921. Portland State University. https://doi.org/10.15760/etd.5805, pp. 1-22 (22 pages).

Tayyib et al., "Overview of tracer applications in oil and gas industry" (2019), SPE-198157-MS, 21 pages.

Qamber et al., "The application of chemical tracer monitoring in multi stage acid frac wells in the mature Bahrah field, North Kuwait", (2019), SPE-198037-MS, 19 pages.

C. Gao et al., "Functionalized Polysaccharides as Transient Markers for Subsurface Monitoring," Energy Fuels, 2022, 36, 8, 4328-4338, Apr. 11, 2022 (11 pages).

D. Wong et al., "Intense Pulsed Light-Treated Near-Field Electrospun Nanofiber on a Quartz Tuning Fork for Multimodal Gas Sensors", ACS Applied Materials & Interfaces, 2020, 12, 21, 24308-24318, May 1, 2021 (30 pages).

A. Y. El Naggar et el., "Monitoring of trace chloride ions at different stages of the gas production process", Arabian Journal of Chemistry, vol. 8, Issue 1, pp. 15-24, Published Online Mar. 9, 2011 (10 pages).

Office Action issued in Saudi Arabian Application No. 123450046, mailed on May 25, 2025 (20 pages).

Non-Final Office Action issued in related U.S. Appl. No. 18/651,517 dated Apr. 11, 2025 (27 pages).

Non-Final Office Action issued by U.S. Patent Office for corresponding U.S. Appl. No. 18/597,332, mailed Feb. 13, 2025 (16 pages).

Non-Final Office Action issued by the U.S. Patent Office for corresponding U.S. Appl. No. 18/749,660, mailed Jun. 18, 2025 (15 pages).

* cited by examiner

200

Blending a first degradable polymer with a second degradable polymer to provide a degradable polymer blend — 210

Dispersing a tracer in the degradable polymer blend to provide a polymer composite particle — 220

Introducing the polymer composite particle into a stimulation fluid — 230

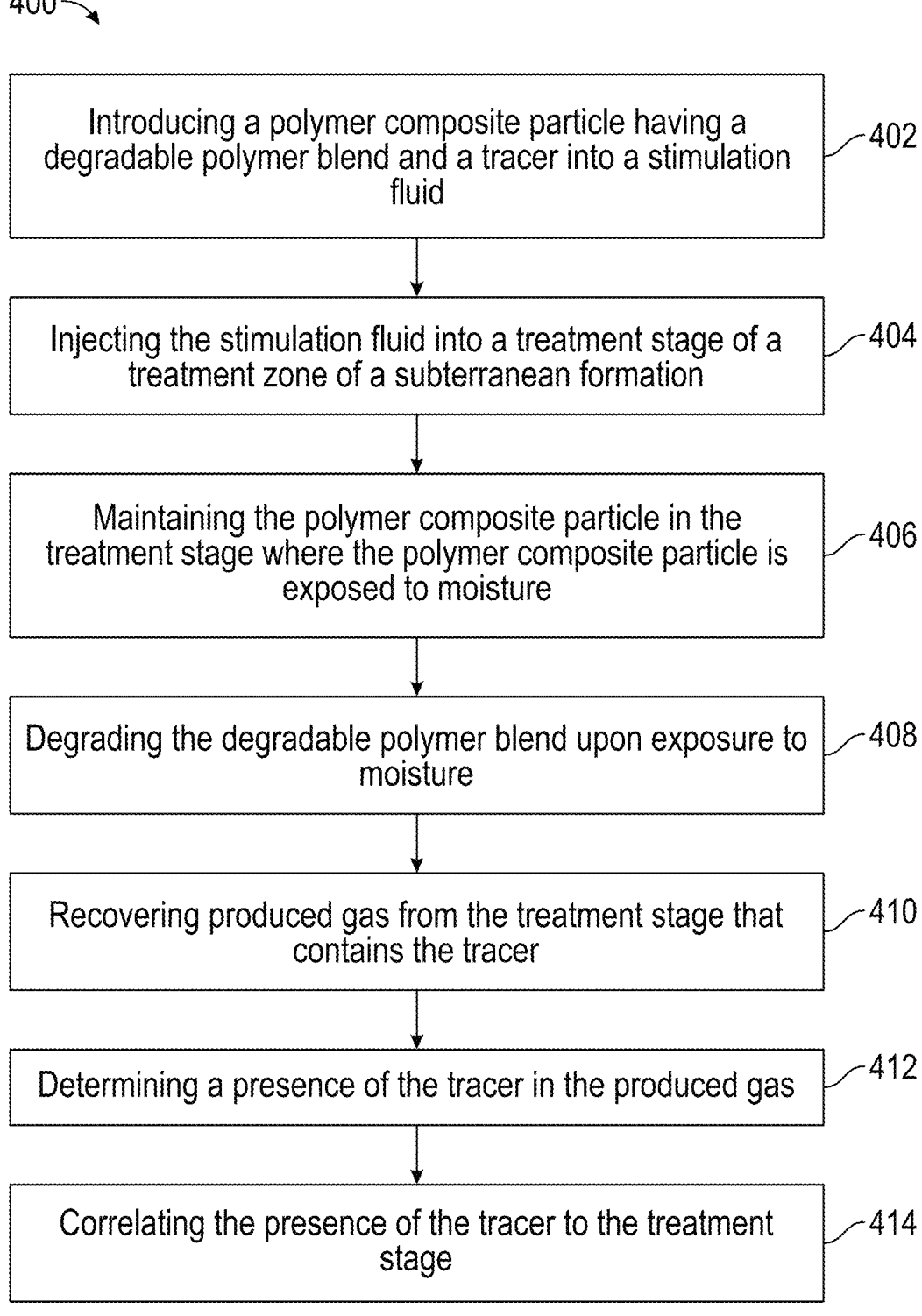

400

Introducing a polymer composite particle having a degradable polymer blend and a tracer into a stimulation fluid — 402

Injecting the stimulation fluid into a treatment stage of a treatment zone of a subterranean formation — 404

Maintaining the polymer composite particle in the treatment stage where the polymer composite particle is exposed to moisture — 406

Degrading the degradable polymer blend upon exposure to moisture — 408

Recovering produced gas from the treatment stage that contains the tracer — 410

Determining a presence of the tracer in the produced gas — 412

Correlating the presence of the tracer to the treatment stage — 414

FIG. 4

TIME DEPENDENT TRACER RELEASE IN STIMULATED GAS WELLS USING COMPOSITE PARTICLES MADE OF THERMOPLASTIC POLYESTER AND POLYAMIDE BLENDS OF VARIOUS RATIOS

BACKGROUND

In the oil and gas industry, tracers are used for monitoring, mapping, and confirming the presence of hydrocarbons in place as well as the production of hydrocarbons from various zones of interest in a reservoir. For example, tracers are used for applications such as waterflood optimization, remaining oil saturation determination, fluid pathway identification, and inter-well connectivity determination. Nonetheless, tracer technology for produced gas monitoring is limited, especially after acidizing and fracturing jobs. Currently, special tools can be installed downhole to monitor gas production, however these tools are expensive and often provide signals that overlap with existing chemicals in the reservoir, making gas monitoring less accurate.

Volatile organic compounds produced from the subterranean formation contain trace amounts of a large spectrum of chemicals containing a wide range of functional groups. Accordingly, the use of chemical gas tracers is a challenge, and the state-of-the-art chemical tracers are based on expensive and/or toxic fluorinated or deuterated gaseous molecules that are not found naturally in the environment. Additionally, such tracers are present in the produced gas in trace amounts, making unambiguous detection and analysis difficult. As such, there exists a need for the development of cost-effective, environmentally friendly chemical tracers that may readily pinpoint gas production from a given zone in a reservoir in the oil and gas industry.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for monitoring gas production in a subterranean formation. The method may include introducing a polymer composite particle having a degradable polymer blend and a tracer into a stimulation fluid, where the degradable polymer blend includes a polymer blend of a first degradable polymer and a second degradable polymer; injecting the stimulation fluid including the polymer composite particle into the subterranean formation to a treatment stage of a treatment zone including at least one opening, where the polymer composite particle flows into and remain inside the at least one opening; maintaining the polymer composite particle inside the at least one opening for an amount of time during which the polymer composite particle is exposed to moisture at a downhole temperature, where the moisture degrades the degradable polymer blend in the amount of time ranging from 7 to 15 days; recovering produced gas from the subterranean formation, where the produced gas includes a gaseous phase from the treatment stage of the treatment zone of the subterranean formation and the tracer; determining a presence of the tracer in the produced gas; and correlating the presence of the tracer to the treatment stage of the treatment zone of the subterranean formation.

In another aspect, embodiments disclosed herein relate to a composition including a polymer composite particle and a stimulation fluid. The polymer composite particle may include a degradable polymer blend of a first degradable polymer and a second degradable polymer and a tracer; where the first degradable polymer may be polyester, polyester copolymers, and combinations thereof, and the second degradable polymer may be a polyamide.

Other aspects and advantages of the claimed subject matter will be apparent from the following description and the appended claims.

BRIEF DESCRIPTION OF DRAWINGS

FIG. 4 is a flow chart of a method in accordance with one or more embodiments.

DETAILED DESCRIPTION

The present disclosure relates to compositions and methods for monitoring gas production from various zones of interest in a subterranean formation. Disclosed compositions include a polymer composite particle having a degradable polymer blend and a tracer. The tracer may be dispersed in the degradable polymer blend. The degradable polymer blend may include a polymer blend of a first degradable polymer and a second degradable polymer. Methods disclosed herein may include injecting polymer composite particles into a subterranean formation with a stimulation fluid or after a stimulation fluid. Within the formation, the polymer composite particles may flow into and reside inside fractures, where, over time, the degradable polymer blend may degrade, releasing the tracer. The specific blend of polymers allows for the blend to degrade under certain conditions in a desired period of time. The tracer may then travel to the surface with the produced gas. Produced gas from the subterranean formation may be monitored for the presence of the tracer. As such, compositions and methods in accordance with the present disclosure may provide accurate monitoring of gas production in subterranean formations.

Polymer Composite Particle Composition

In one aspect, embodiments disclosed herein relate to a composition including a polymer composite particle and a stimulation fluid. Polymer composite particles in accordance with the present disclosure each include a degradable polymer blend and a tracer. The degradable polymer blend may be a polymer blend of a first degradable polymer and a second degradable polymer. The first degradable polymer may be a polyester. The second degradable polymer may be a polyamide. In one or more embodiments, the blend ratio of the first degradable polymer to the second degradable polymer in the degradable polymer blend leads to different rates of degradation and different times of release of the tracer. The rate of degradation of the degradable polymer blend may range from 7 to 15 days.

Figure 1:
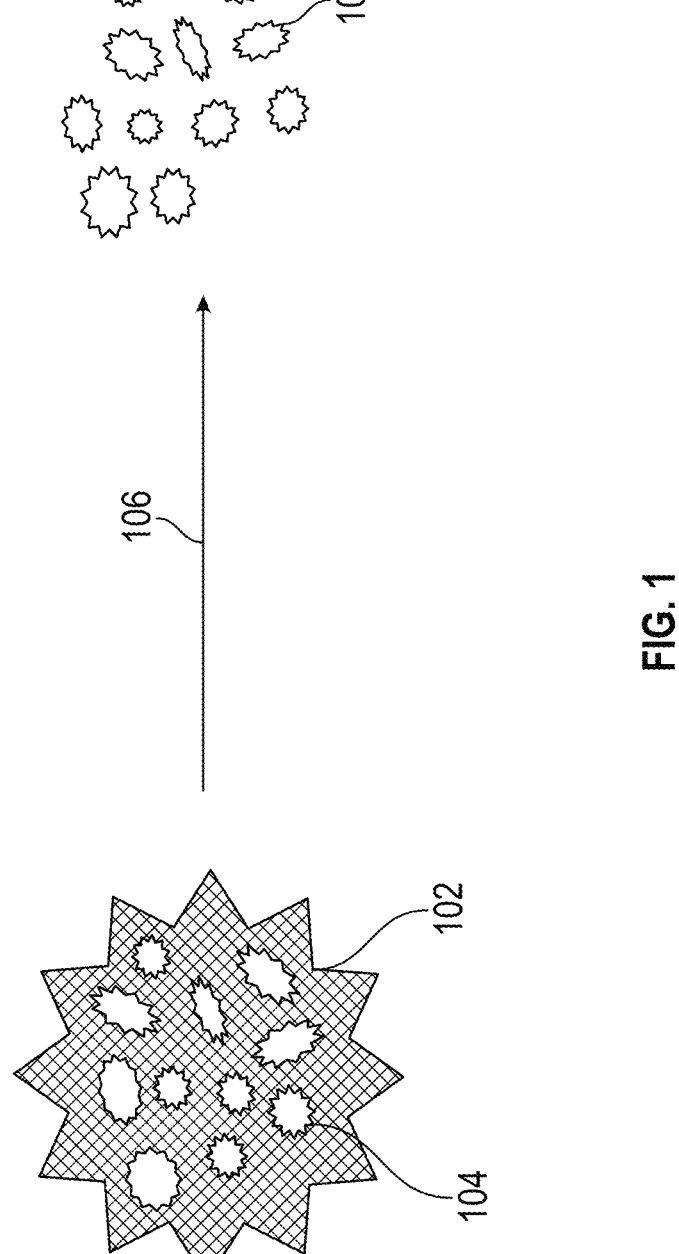
FIG. 1 is a depiction of a polymer composite particle in accordance with one or more embodiments.

FIG. 1 is a schematic of a polymer composite particle 100 in accordance with one or more embodiments. The polymer composite particle 100 includes a degradable polymer blend 102 and a tracer 104. The degradable polymer blend 102 may be a polymer blend of a first degradable polymer and a second degradable polymer. Degradation 106 (represented by the arrow) of the degradable polymer blend may release the tracer 104. The tracer may become an aerosol 108 after degradation 106 of the degradable polymer blend 102.

Herein, a degradable polymer blend 102 refers to a blend of a first degradable polymer and a second degradable polymer. Each of the polymers in the blend have hydrolysable bonds in the backbone, and as such, may be hydrolyzed into monomers and/or oligomers in the presence of water and heat. The first degradable polymer may include degradable polymers of polyester, polyester copolymers, and combinations thereof. Copolymers may include two variations of the same type of polymer, or two different polymers. A polyester copolymer may be a copolymer of polyester and modified polyester or a copolymer of a polyester and another polymer. For example, a polyester copolymer may be a copolymer of polyester and modified polyester or a copolymer of polyester and polybutylene terephthalate. In one or more embodiments, the first degradable polymer is a polyester or a copolymer of polyester including polylactic acid, polyglycolic acid, polycaprolactone, polyarylates, polyethylene phthalate, polyethylene terephthalate, polybutylene terephthalate, polytrimethylene terephthalate, polyethylene naphthalate, and combinations thereof. Commercial examples of the first degradable polymer may include thermoplastic copolyester (TPE) Hytrel® 7246 (DuPont) or thermoplastic polyurethane (TPU) Laripur (Coim), Desmopan (Covestro) and Elastollan (BASF). The first degradable polymer may have a molecular weight in the range of 20,000 to 300,000 g/mol.

The second degradable polymer may include degradable polymers of polyamides. In one or more embodiments, the second degradable polymer is a polyamide such as nylon, kevlar, nomax, polyamide-imides, polyphthalamide, and combinations thereof. Commercial examples of the second degradable polymer may include, but are not limited to, Vydyne® 21Z-NT01A2 (Ascend Performance).

In one or more embodiments, the polymer composite particle 100 includes a degradable polymer blend 102 of a first degradable polymer and a second degradable polymer. The amount of the first degradable polymer and the second degradable polymer included in the degradable blend may be chosen based on the desired rate of degradation. For example, the first degradable polymer may have a degradation rate of 60 days. The second degradable polymer may have a degradation rate of 6 days. The amount in which the two degradable polymers are blended may be chosen to achieve an intermediate degradation rate. The intermediate degradation rate is a degradation rate that occurs between the degradation rate of the first degradable polymer and the second degradable polymer, meaning the degradation rate of the polymer blend. In one or more embodiments, the intermediate degradation rate may range from 7 to 15 days. For example, the intermediate degradation rate may be 7, 8, 9, 10, 11, 12, 13, 14 or 15 days.

In the degradable polymer blend 102, the first degradable polymer may be present in an amount ranging from 10 to 90 wt % (weight percent). For example, the first degradable polymer may be present in an amount with a lower limit of any of 10, 20, 30, and 40 wt % and an upper limit of any of 50, 60, 70, 80, and 90 wt %, where any lower limit may be paired with any mathematically compatible upper limit. The second degradable polymer may also be present in the degradable polymer blend 102 in an amount ranging from 10 to 90 wt %, where any amount of the first degradable polymer may be paired with any mathematically compatible amount of the second degradable polymer. For example, in a polymer blend, the first degradable polymer is present in the amount of 10 wt %. Thus, the second degradable polymer is present in the amount of 90 wt %, where the combination of the two amounts equals 100 wt % of the degradable polymer blend 102. The amount of time in which degradation 106 of the degradable polymer blend occurs may depend on the amount of each degradable polymer included in the blend. For example, if 10% of the first degradable polymer is included, the amount of time for degradation may be 7 days. If 50% of the first degradable polymer is included, the amount of time for degradation may be 11 days. If 90% of the first degradable polymer is included, the amount of time for degradation may be 15 days.

In one or more embodiments, the degradable polymer blend 102 may be included in the polymer composite particle 100 in an amount ranging from 20 to 99.9995 wt % based on the total weight of the polymer composite particle. For example, the polymer composite particle 100 may include the degradable polymer blend 102 in an amount having a lower limit of any of 20, 25, 30, 35, 40, 45, 50, 55, and 60 wt % and an upper limit of any of 50, 55, 60, 65, 70, 75, 80, 85, 90, 95, and 99.9995 wt %, where any lower limit may be paired with any mathematically compatible upper limit.

In one or more embodiments, the polymer composite particle 100 contains a tracer 104. In one or more embodiments, the tracer 104 is non-degradable. The tracer 104 may be dispersed throughout the degradable polymer blend 102. Any type of detectable tracer may be used. For example, tracers that are visible or detectable by fluorescence, UV-Vis, FT-IR, X-ray fluorescence (XRF), or GC-MS may be included in polymer composite particle compositions. In one or more embodiments, the tracer is an optical tracer. The optical tracer may be a dye detectable by fluorescence and/or UV-Vis spectroscopy such as tetrachloroisoindolinone orange, perylene red, quinacridone red, phthalocyanine blue, phthalocyanine green, disazo diarylide yellows, among others. In other embodiments, the tracer is a tracer detectable by other methods. For example, suitable FT-IR and GC-MS detectable tracers include, but are not limited to, polychloroethylene, polybromostyrene, polyfluorostyrene, and combinations thereof. Similarly, metal complexes that are detectable by XRF such as oxides including $ZnO$, $Fe_2O_3$, $Co_2O_3$, $Ni_2O_3$, $Cr_2O_3$, $CuO$, $MnO_x$, $ZrO_2$, $TiO_2$, or sulfides including $ZnS$, $Ce_2S_3$, and any combinations thereof, may be used as tracers in polymer composite particles of one or more embodiments.

In one or more embodiments, the tracer 104 may be present in the polymer composite particle 100 in an amount ranging from 0.0005 to 50 wt % based on the total weight of the polymer composite particle composition. For example, polymer composite particle compositions may include a tracer in an amount having a lower limit of any of 0.0005, 0.001, 0.002, 0.005, 0.01, 0.02, 0.03, 0.04, 0.05, and 0.1 wt % and an upper limit of any of 0.1, 0.5, 1.0, 5.0, 10, 15, 20, 25, 30, 35, 40, 45, and 50 wt %, where any lower limit may be paired with any mathematically compatible upper limit.

In one or more embodiments, the tracer 104 is of a size that allows for forming an aerosol 108. In such embodiments, the tracer 104 may have an average particle diameter ranging from about 100 nm to 300 microns. For example, the tracer may have an average diameter ranging from a lower limit of any of 100, 200, 400, 500, 600, 700, 800, 900 and 1,000 nm to an upper limit of any of 120, 150, 175, 200, 225, 250, 275, and 300 microns, where any lower limit may be paired with any mathematically compatible upper limit.

As described above, the tracer 104 may be mixed with a degradable polymer blend 102 to provide a polymer composite particle 100 in accordance with the present disclosure. As such, polymer composite particles may be significantly larger than the tracer 104. Polymer composite particles may have an average particle size ranging from 10 microns to 10 mm (millimeters). In one or more embodiments, polymer composite particles may have an average particle size having a lower limit of any of 10, 20, 30, 40, 50, 60, 70, 80, 90, and 100 microns to an upper limit of any of 1, 2, 3, 4, 5, 6, 7, 8, 9, and 10 mm (millimeters), where any lower limit may be paired with any mathematically compatible upper limit.

The polymer composite particle in accordance with the present disclosure may be designed to have properties that enable the polymer composite particle to flow into and remain inside openings in the rock matrix of a subterranean formation. Such properties include size, as described above, aspect ratio, and physical structure, among others. The at polymer composite particle may have an aspect ratio ranging from 1 to 500. For example, the polymer composite particle in one or more embodiments may each have an aspect ratio having a lower limit of any of 1, 2, 5, 8, 10, 15, 20, 25, 40, 50, 75, and 100 and an upper limit of any of 75, 100, 150, 200, 250, 300, 350, 400, 450, and 500, where any lower limit may be paired with any mathematically compatible upper limit. The polymer composite particle having an aspect ratio above 100 may have a shape similar to a fiber, whereas the polymer composite particle having an aspect ratio below 50 may have a shape similar to a sphere. In one or more embodiments, the polymer composite particle having an aspect ratio greater than 500 may be capable of bridging the openings (i.e., wormholes/fractures) in the formation. Herein, "bridging" refers to the ability of a particle to lodge inside an opening of the subterranean formation, such that it may remain in place until the degradable polymer degrades, thus releasing the tracer. Such "bridging" of an opening may be important to achieving the desired time-release of the tracers. Furthermore, the physical structure of the polymer composite particle is an important property in compositions of the present disclosure. Polymer composite particles having a large particle size distribution (i.e., a mixture of particles with different sizes) may be suitable for remaining inside the openings of a subterranean formation. For example, particles having different diameters may pack into openings more efficiently given that the openings are not of uniform size from start to finish. As such, a greater concentration of particles may be spread across an entire wormhole or fracture.

Method for Preparing Polymer Composite Particles

Figure 2:
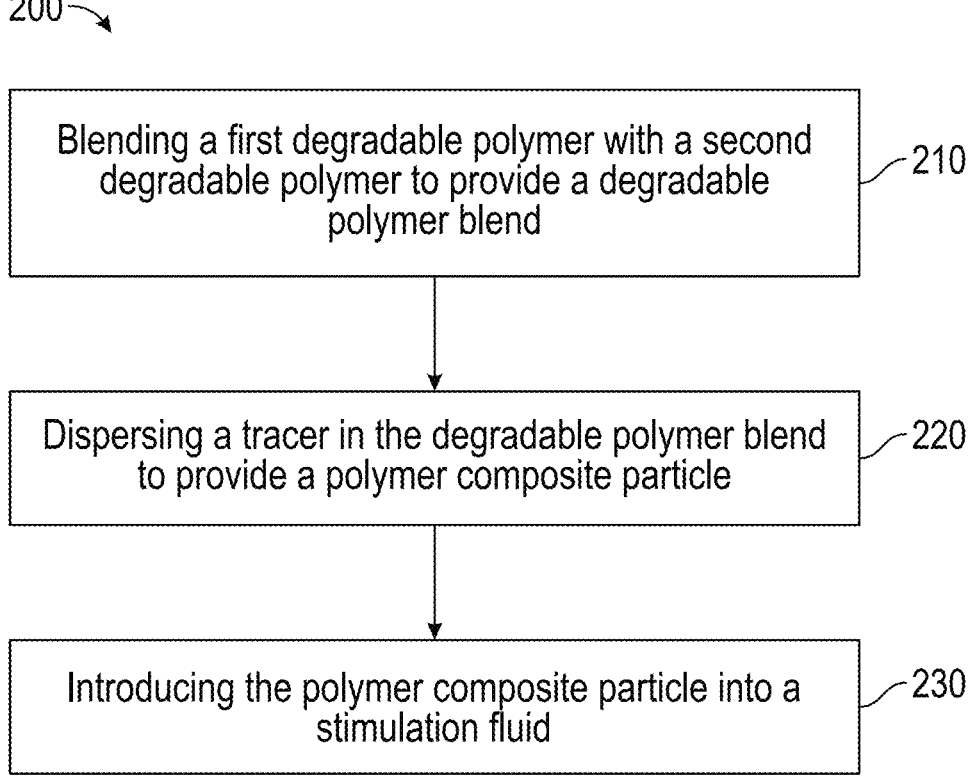
FIG. 2 is a flow chart of a method in accordance with one or more embodiments.

One or more embodiments of the present disclosure relate to a method for preparing the previously described polymer composite particle composition. An exemplary method 200 is shown in FIG. 2. Block 210 of method 200 may include blending a first degradable polymer with a second degradable polymer to provide a degradable polymer blend. The first and second degradable polymers may be appropriately chosen based upon the polymer composite particle that is being made and are as previously described. The first degradable polymer may be blended with the second degradable polymer via melt extrusion. Melt extrusion may include a twin screw extruder to blend the first and second degradable polymers. The extruder may be held at a temperature in the range of 200 to 300° C. The first and second degradable polymer may be blended for a period of 20 seconds to 5 minutes to produce the degradable polymer blend. The amount of the first and second degradable polymer in the degradable polymer blend may be chosen based on the desired intermediate degradation rate and are as previously described.

Block 220 of method 200 includes dispersing a tracer in the degradable polymer blend to provide a polymer composite particle. Dispersing the tracer in the degradable polymer blend may include compounding. Compounding may occur at a temperature ranging from 240 to 280° C.

Block 230 of method 200 includes introducing the polymer composite particle into a stimulation fluid. The stimulation fluid composition is further described below.

Stimulation Fluid Composition

The polymer composite particle, as previously described, may be added to a stimulation fluid to provide a stimulation fluid composition. The disclosed polymer composite particles may be suitable for use in any stimulation fluid. In one or more embodiments, the stimulation fluid is an acidizing fluid, an organic acid, a fracturing fluid, a hydraulic fracturing fluid, an emulsified acid, a viscoelastic surfactant, a foamed fluid, a linear gel, and a crosslinked gel, among others. In one or more embodiments, at least two polymer composite particles including at least two different degradable polymers are added to acidizing fluid or hydraulic fracturing fluid.

One or more embodiments of the stimulation fluid include an aqueous-based fluid. The aqueous-based fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the stimulation fluid.

In one or more embodiments, the stimulation fluid may contain water in a range of from about 50 wt % to 97 wt % based on the total weight of the stimulation fluid. In one or more embodiments, the stimulation fluid may comprise greater than 70 wt % water based on the total weight of the stimulation fluid.

In some embodiments, the stimulation fluid may incorporate an acid in the aqueous-base fluid. The acid may be an inorganic acid, an organic acid, or both. The inorganic acid may include, but are not limited to, hydrochloric acid, nitric acid, hydrofluoric acid, hydrobromic acid, perchloric acid, hydroiodic acid, fluoroboric acid, or derivatives, and mixtures thereof. Suitable organic acids include, but are not limited to, alkanesulfonic acids, arylsulfonic acids, formic acid, acetic acid, methanesulfonic acid, p-toluenesulfonic acid, alkyl carboxylic acids, aryl carboxylic acids, lactic acid, glycolic acid, malonic acid, fumaric acid, citric acid, tartaric acid, chloroacetic acid, dichloroacetic acid, trichloroacetic acid, fluoroacetic acid, difluoroacetic acid, trifluoroacetic acid, glutamic acid diacetic acid, methylglycindiacetic acid, 4,5-imidazoledicarboxylic acid, and combinations thereof. Acid-generating systems may include esters and/or formates that are water soluble or partially water soluble. Suitable acid-generating compounds may include esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, and combinations thereof. Exemplary acid-generating compounds include lactic acid derivatives, methyl lactate, ethyl lactate, propyl lactate, and butyl lactate. In some embodiments, the acid-generating compound is a formate ester including, but not limited to, ethylene glycol monoformate, ethylene glycol diformate, diethylene glycol diformate, glyceryl monoformate, glyceryl diformate, glyceryl triformate, triethylene glycol diformate, and formate esters of pentaerythritol. In certain embodiments, the acid-generating compound is ethylene glycol monoformate or diethylene glycol diformate. In some embodiments, the acid-generating compound is a nitrile-containing compound. In some embodiments, the acid-generating compound is an ester, for instance, polyesters of glycerol including, but not limited to, tripropionin (a triester of propionic acid and glycerol), trilactin, and esters of acetic acid and glycerol such as monoacetin, diacetin, and triacetin. Other suitable esters include aliphatic polyesters, poly(lactides), poly(glycolides, poly(E-caprolactones), poly(hydroxybutyrates), poly(anhydrides), aliphatic polycarbonates, poly(amino acids), and polyphosphazenes, or copolymers thereof, or derivatives and combinations thereof. These acid-producing systems may provide the corresponding acids when hydrolyzed in the presence of water.

The acid may be present in an aqueous-based fluid at a concentration ranging from about 5 wt % to about 35 wt %. For example, the aqueous-base fluid may have an acid in an amount having a lower limit of any of 5, 7, 10, 12, 15, and 20 wt % and an upper limit of any of 15, 20, 22, 25, 27, 30, 32, and 35 wt %, where any lower limit may be paired with any mathematically compatible upper limit. In one or more embodiments, the stimulation fluid is an acidizing fluid including about 28 wt % of hydrochloric acid.

In one or more embodiments, the stimulation fluid includes a suitable amount of polymer composite particles. The amount of the polymer composite particles may be adjusted depending on the type of tracer included in the polymer composite particles. The amount of the polymer composite particles may also be adjusted depending on the degradable polymer blend included in the polymer composite particles. In one or more embodiments, the stimulation fluid may include from 0.2 to 10 lbm/gal (pound-mass per thousand gallon) of the polymer composite particles relative to the total amount of stimulation fluid. For example, the stimulation fluid may include polymer composite particles in an amount having a lower limit of any of 0.2, 0.3, 0.5, 1.0, 1.5, 2.0, 2.5, 3.0, 3.5, 4.0, and 4.5 lbm/gal and an upper limit of any of 5.0, 5.5, 6.0, 6.5, 7.0, 7.5, 8.0, 8.5, 9.0, 9.5, and 10 lbm/gal, where any lower limit may be paired with any mathematically compatible upper limit.

In one or more embodiments, when the stimulation fluid is a hydraulic fracturing fluid, the hydraulic fracturing fluid includes a proppant. Proppants are often included in stimulation fluids to help keep fractures open and capable of supporting the flow of hydrocarbons from a subterranean formation to a wellbore. Such proppants may include gravel, sand, bauxite, or glass beads. Any type of proppant may be added to the stimulation fluid. Suitable proppants may have a size ranging from 200 to 8 mesh. In some embodiments, the proppant may be coated with the polymer composite particle. In other embodiments, the proppant may be mixed with the at least two polymer composite particles to provide a proppant/particle mixture that includes the polymer composite particles in an amount ranging from 1.0 to 100 wt %, relative to the weight of the proppant. In such a proppant/particle mixture, the polymer composite particles may be present in an amount having a lower limit of any of 1.0, 1.5, 2.0, 2.5, 3.0, 3.5, 4.0, 4.5, and 5.0 wt % and an upper limit of any of 10, 20, 30, 40, 50, 60, 70, 80, 90, and 100 wt %, where any lower limit may be paired with any mathematically compatible upper limit.

In one or more embodiments, the stimulation fluid may optionally include additional additives. Examples of such additional additives may include, but are not limited to, emulsifiers, friction reducers, fibers, oxidizing agents, lost circulation materials, scale inhibitors, surfactants, clay stabilizers, corrosion inhibitors, paraffin inhibitors, asphaltene inhibitors, penetrating agents, clay control additives, iron control additives, reducers, oxygen scavengers, sulfide scavengers, foamers, gases, derivatives thereof, and combinations thereof.

Method for Monitoring Gas Production

In another aspect, embodiments disclosed herein relate to a method for monitoring gas production of a subterranean formation using the previously described polymer composite particle composition. In one or more embodiments, the method includes the use of a polymer composite particle containing a degradable polymer blend and a tracer. The degradable polymer blend may be exposed to moisture in the subterranean formation. The moisture may degrade the degradable polymer blend in the polymer composite particle in an amount of time ranging from 7 to 15 days.

Figure 3:
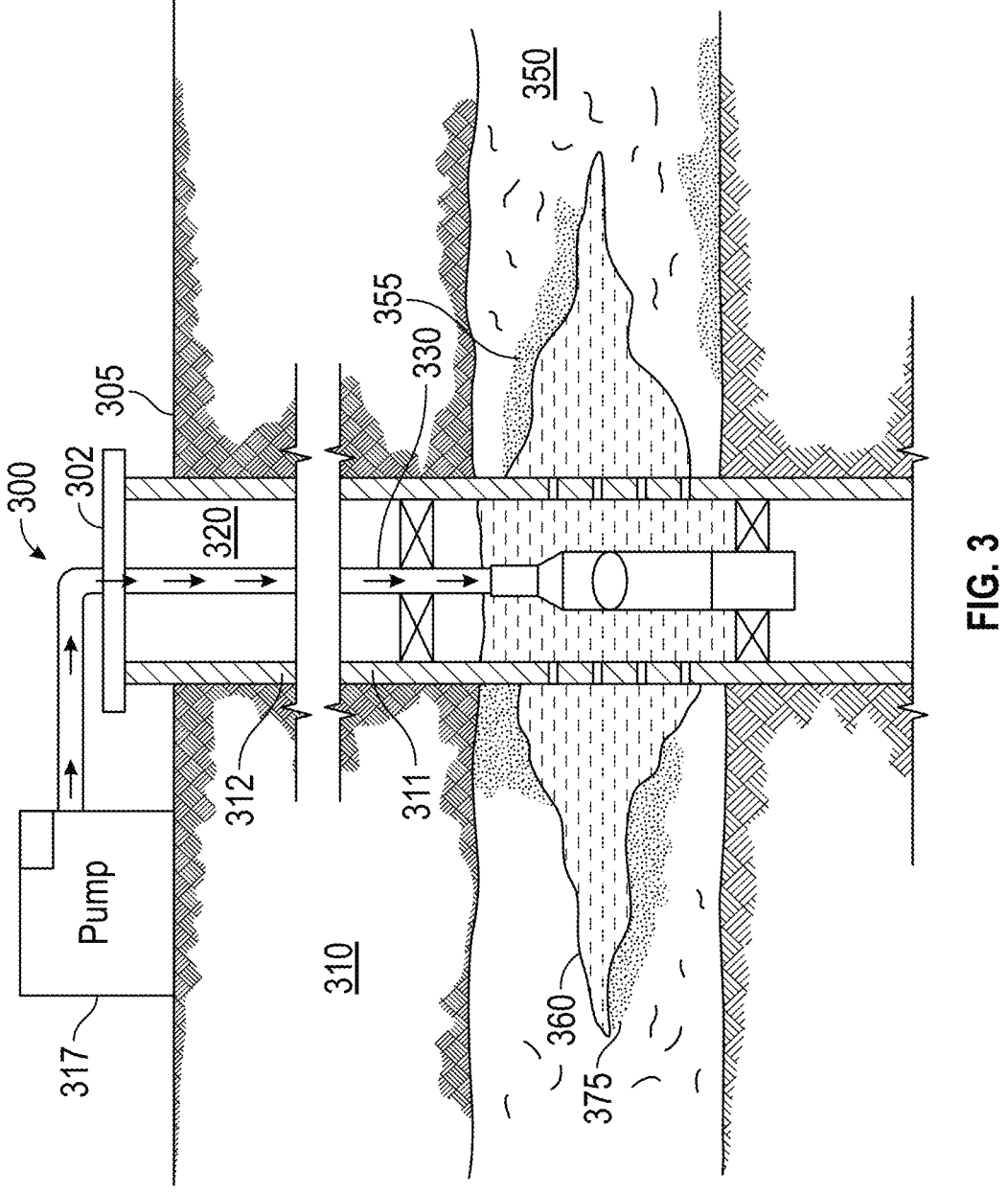
FIG. 3 is a depiction of a well environment in accordance with one or more embodiments.

FIG. 3 is a diagram that illustrates a well environment 300 in accordance with one or more embodiments of the present disclosure. Well environment 300 includes a surface 305 and a subsurface 310. Subsurface 310 is depicted having a wellbore wall 311 both extending downhole from a surface 305 into the subsurface 310 and defining a wellbore 320. The well environment includes a well head 302 at the surface 305. The subsurface also includes subterranean formation 350 in which the stimulation fluid is injected and subsequently, the gas production is monitored. Subterranean formation 350 has subterranean formation face 355 that fluidly couples subterranean formation 350 with wellbore 320 through wellbore wall 311. In this case, casing 312 extends downhole through the wellbore 320 into the subsurface 310 and towards subterranean formation 350.

With the configuration in FIG. 3, the previously described stimulation fluid composition including a polymer composite particle may be introduced into the subsurface 310 and towards subterranean formation 350 via a pump 317 through valves located in the well head and down the work string 330. The stimulation fluid may generate a fracture 360 in the rock 375 of the subterranean formation 350. As noted above, polymer composite particles may become lodged in openings in the fracture 360. Hydrocarbon-bearing formations may include any oleaginous fluid, such as crude oil, dry gas, wet gas, gas condensates, light hydrocarbon liquids, tars, asphalts, and other hydrocarbon materials. Hydrocarbon-bearing formations may also include aqueous fluid, such as water and brines. Embodiment polymer composite particle compositions may be appropriate for use in different types of subterranean formations, such as carbonate, dolomite, shale, sandstone, and tar sands.

A method for monitoring gas production from a reservoir in subterranean formation 350 in accordance with one or more embodiments is shown in and discussed with reference to FIG. 4. Block 402 of method 400 includes introducing a stimulation fluid having a polymer composite particle with a degradable polymer blend and a tracer. The polymer composite particle is as previously described. At block 404, the stimulation fluid may then be injected into a treatment zone of the subterranean formation through the wellbore. In the treatment zone, there may be multiple treatment stages. The stimulation fluid may be injected into a specific treatment stage of the treatment zone. Upon injection into the treatment stage of the treatment zone, the stimulation fluid may induce the development of small openings (i.e., fractures/wormholes) in the subterranean formation. At block 406, the polymer composite particles may flow into the formed openings with the stimulation fluid and subsequently be maintained inside the formed openings once the stimulation fluid has been depleted. Polymer composite particles may be tailored to have properties, such as morphology/shape, size, and aspect ratio, that provide for the "trapping" of the polymer composite particle in the openings of the subterranean formation.

After being trapped in the openings of the subterranean formation at the treatment stage for an amount of time, the polymer composite particle may be exposed to moisture from the subterranean formation. At block 408, upon exposure to moisture at an elevated downhole temperature, the hydrolysable bonds of the degradable polymer blend may be hydrolyzed, and the degradable polymer blend portion may begin to degrade. Depending on the amount of the first degradable polymer and the second degradable polymer in the degradable polymer blend, degradation of the degradable polymer blend may occur in an amount of time ranging from 7 to 15 days. As previously described, the amount of time in which degradation of the degradable polymer blend occurs may depend on the amount of each degradable polymer included in the blend. For example, if 10% of the first degradable polymer is included, the amount of time for degradation may be 7 days. If 50% of the first degradable polymer is included, the amount of time for degradation may be 11 days. If 90% of the first degradable polymer is included, the amount of time for degradation may be 15 days. Thus, complete degradation of the degradable polymer blend may take an amount of time ranging from 7 to 15 days. The degradation also may depend on moisture content and the downhole temperature of the treatment zone. The treatment zone may have a downhole temperature ranging from 70° C. to 150° C.

After at least some degradation of the degradable polymer blend, the tracer may be released. The tracer may be selected based on size and composition so that it may be carried to the surface of the subterranean formation with a gaseous phase, as in block 410. Block 412 of method 400 then includes determining the presence of the tracer in the produced gas. At the surface, the tracer may be recovered and collected, analyzed, and correlated to the treatment stage of the treatment zone in the target formation, as in block 414. The tracer may be collected via any device known in the art such as an environmental air sampler or a gas-permeable membrane filter. Any method suitable for analysis of the tracer may be used to analyze the tracer including, but not limited to, fluorescence spectroscopy, microscopy, UV-Vis spectroscopy, FT-IR spectroscopy, Raman spectroscopy, GC-MS, pyrolysis GC-MS, X-ray fluorescence, inductively coupled plasma optical emission spectroscopy (ICP-OES), inductively coupled plasma mass spectrometry (ICP-MS), and optical imaging. The results of the analysis can be used to monitor which stage or zone is producing gas as a function of time after a stimulation operation.

As described above, a given treatment zone of a subterranean formation may have multiple treatment stages. Likewise, a given subterranean formation may have multiple treatment zones. In some embodiments, a formation may have anywhere from two to 80 treatment zones. Accordingly, stimulation fluids including distinct polymer composite particles may be injected into different treatment stages of a treatment zone, and different treatment zones of a subterranean formation. For example, in one or more embodiments, methods may include injecting a first stimulation fluid including a first polymer composite particle into a first treatment stage of a treatment zone. Then, a second stimulation fluid including a second polymer composite particle may be injected into a second treatment stage of the treatment zone. The number of different stimulation fluids including distinct polymer composite particles that may be injected into the same treatment zone or the same subterranean formation is not particularly limited. In some embodiments, up to 80 different stimulation fluid including distinct polymer composite particles may be injected in up to 80 different treatment stages of a treatment zone. In methods in which multiple different polymer composite particles are injected and remain inside openings (i.e., fractures/wormholes) of multiple different treatment stages, the produced gas may include one or more tracers from the different polymer composite particle. Such methods may provide more accurate gas production monitoring as the origin of produced gas may be more readily determined.

Embodiments of the present disclosure may offer at least the following advantages. Use of the disclosed polymer composite particles in methods herein may provide for the confirmation of gas production from stimulated zones of a formation, according to various stimulated stage or stages based on the chemical fingerprint of the tracer at the surface. Additionally, the degradable polymer blend of the polymer composite particles of one or more embodiments may offer a tunable time-released tracer, that may reside in the wormholes or fractures of a formation for a specific amount of time. The degradation of the polymer composite particle may be tuned by varying the amount of the degradable polymers in the degradable polymer blend.

EXAMPLES

Example 1: Sample Preparation

A HAAKE MiniLab 3 twin screw extruder was used for melt extrusion of nylon/polyamide (Vydyne® 21Z-NT01A2, Ascend Performance Materials) mixed with Hytrel polymer (Hytrel® 7246, DuPont). For this experiment, three samples were prepared by mixing polyamide with Hytrel polymer at different composition ratios to achieve tunable degradation periods. Three weight percentage (wt %) composition ratios were chosen for combining polyamide with Hytrel: 1:1, 1:9, and 9:1 respectively. For 1:1 ratio, 2 grams of polyamide were mixed with 2 grams of Hytrel. For 1:9, 0.4 grams of polyamide was mixed with 3.6 grams of Hytrel. For 9:1 ratio, 3.6 grams of polyamide was mixed with 0.4 grams of Hytrel. During the extrusion process, all heating zones of the extruder were held at a similar temperature of 260° C. The final combined material implemented the cross-sectional profile of a thin circular die. After extrusion, the polymer samples were stored in glass vials at room temperature.

Example 2: Degradation Experiment

Samples were tested/aged at 150° C. and close to 100% relative humidity conditions for degradation by placing them into a pressure vessel. Polymer composites were put into a distinct glass vial before placing them into the pressure vessel that was filled with around 5 mL of water without any direct contact between samples and liquid water. The vessel was purged with ultra-high purity argon to prevent oxidation of the samples. After that, samples were aged and monitored for degradation daily. Samples demonstrated different degradation periods as summarized in Table 1. For 1:1 ratio, sample degraded in 11 days. For 9 (polyamide): 1 (Hytrel), sample degraded in 15 days. For 1 (polyamide): 9 (Hytrel), sample degraded in 7 days. It is important to note that polyamide alone degraded in over 60 days, while Hytrel degraded in 6 days. Therefore, by blending with varying ratios of two polymers with different rate of hydrolysis, intermediate degradation time may be achieved.

TABLE 1

Summary of the degradation periods for composite polymers containing different rations of polyamide and Hytrel ® 7246 when aged at 150° C. and close to 100% relative humidity in the inert atmosphere.

| Sample | Time until degradation (days) |
|---|---|
| Nylon | 60 |
| Nylon:Hytrel ® 7246 (9:1) | 15 |
| Nylon:Hytrel ® 7246 (1:1) | 11 |
| Nylon:Hytrel ® 7246 (1:9) | 7 |
| Hytrel ® 7246 | 6 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for monitoring gas production in a subterranean formation comprising:

introducing a polymer composite particle having a degradable polymer blend and a tracer into a stimulation fluid, wherein the degradable polymer blend comprises a polymer blend of a first degradable polymer selected from the group consisting of polyester, polyester copolymers, and combinations thereof and a second degradable polymer wherein the second degradable polymer comprises a polyamide;

injecting the stimulation fluid comprising the polymer composite particle into the subterranean formation to a treatment stage of a treatment zone comprising at least one opening, wherein the polymer composite particle flows into and remain inside the at least one opening;

maintaining the polymer composite particle inside the at least one opening for an amount of time during which the polymer composite particle is exposed to moisture at a downhole temperature, wherein the moisture degrades the degradable polymer blend in the amount of time of 7 days when the first degradable polymer is present in the polymer blend in an amount of 10 wt % and the second degradable polymer is present in the polymer blend in an amount of 90 wt %, 11 days when the first degradable polymer is present in the polymer blend in an amount of 50 wt % and the second degradable polymer is present in the polymer blend in an amount of 50 wt %, and 15 days when the first degradable polymer is present in an amount of 90 wt % and the second degradable polymer is present in the polymer blend in an amount of 10 wt %;

recovering produced gas from the subterranean formation, wherein the produced gas comprises a gaseous phase from the treatment stage of the treatment zone of the subterranean formation and the tracer;

determining a presence of the tracer in the produced gas; and correlating the presence of the tracer to the treatment stage of the treatment zone of the subterranean formation.

2. The method of claim 1, wherein the first degradable polymer and the second degradable polymer have hydrolysable bonds.

3. The method of claim 1, wherein the tracer is selected from the group consisting of tetrachloroisoindolinone orange, perylene red, quinacridone red, phthalocyanine blue, phthalocyanine green, disazo diarylide yellows, ZnO, $Fe_2O_3$, $Co_2O_3$, $Ni_2O_3$, $Cr_2O_3$, CuO, MnOx, $ZrO_2$, $TiO_2$, ZnS, $Ce_2S_3$, and combinations thereof.

4. The method of claim 1, wherein the stimulation fluid is selected from the group consisting of an acidizing fluid, an organic acid, a fracturing fluid, a hydraulic fracturing fluid, an emulsified acid, a viscoelastic surfactant, a foamed fluid, a linear gel, a crosslinked gel, and combinations thereof.

5. The method of claim 1, wherein the polymer composite particle is introduced into the stimulation fluid in an amount ranging from 0.2 lbm/gal to 10 lbm/gal of the polymer composite particle relative to a total amount of stimulation fluid.

* * * * *